(No Model.)
E. BARNHARD & A. F. THOMAS.
GRAIN DIVIDER FOR HARVESTERS.
No. 282,947. Patented Aug. 14, 1883.
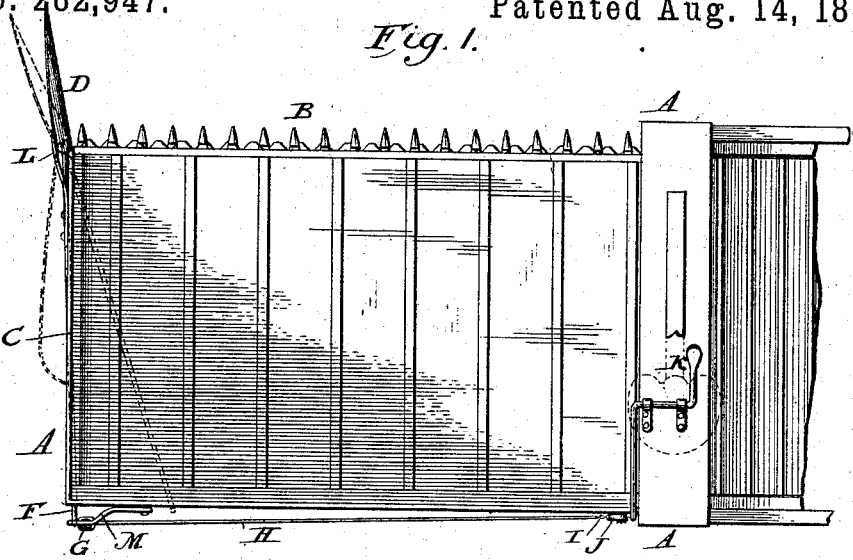
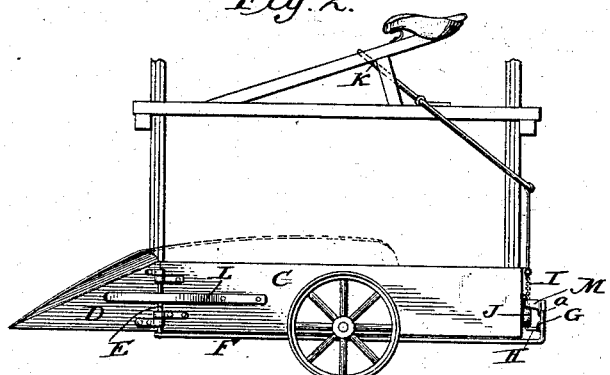
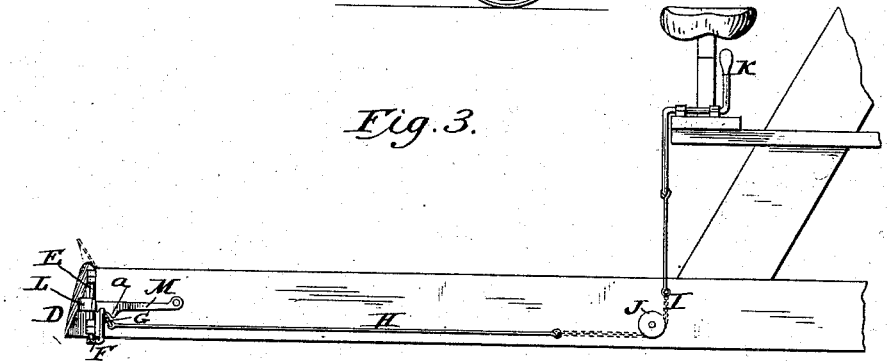
Attest
Sidney P. Hollingsworth
Newton Wyckoff
Inventor
Elias Barnhard
A. F. Thomas
By their Atty.
Philip T. Dodge.

UNITED STATES PATENT OFFICE.

ELIAS BARNHARD AND AARON F. THOMAS, OF TROY, OHIO.

GRAIN-DIVIDER FOR HARVESTERS.

SPECIFICATION forming part of Letters Patent No. 282,947, dated August 14, 1883.

Application filed February 17, 1883. (No model.)

*To all whom it may concern:*

Be it known that we, ELIAS BARNHARD and AARON F. THOMAS, of Troy, in the county of Miami and State of Ohio, have invented certain Improvements in Dividers for Grain-Harvesting Machines, of which the following is a specification.

The object of our invention is to enable the driver to adjust the divider, located on the grain side of the machine, commonly known as the "outer divider," in a horizontal direction at will without dismounting from his seat, in order that said divider may embrace a greater or less width of grain, and thus enable the machine to cut a swath and to produce a rounding corner in the standing grain as the machine is turned at the corners of the field.

To this end the invention consists, essentially, in the combination of a laterally-movable divider with appliances under the control of the driver for adjusting said divider at will.

It further consists in various minor features of construction, which will be hereinafter described.

Our invention may be embodied in various forms, and the details of the mechanism modified in form; but the accompanying drawings represent the preferred construction.

Referring to the accompanying drawings, Figure 1 represents a top plan view of a harvester-platform and a portion of the main frame having our improvement applied thereto. Fig. 2 is an end elevation looking against the outer face of the divider. Fig. 3 is a rear elevation.

Except as to the features hereinafter enumerated, the machine may be of any ordinary or suitable construction.
A represents a rectangular platform, and B the cutting mechanism, located at its forward edge.

C represents the upright grain-board, secured along the outer or grain side of the platform.
D represents our improved divider located at the outer corner of the platform and extending in advance of the cutters, as usual. This divider, instead of being stationary, as usual, is mounted at its rear end upon a vertical shaft, E, in such manner that its forward end may be swung horizontally, so as to embrace and direct to the cutting mechanism a greater or less swath of grain. The shaft by which the divider is sustained is secured at its lower end to an arm or lever, F, extending horizontally beneath the platform and turned upward in rear of the same. To the rear end of this lever I connect, by a loose intermediate link, G, a horizontal rod, H, extending along the rear side of the platform to its inner end, where it is connected to a chain, I, passing beneath a stationary guide-pulley, J, and thence upward to one end of a foot-lever, K, which will be arranged in such position that it may be readily operated by the driver while occupying his seat.

L represents a strong metallic spring bolted to the outer side of the stationary grain-board C, and bearing at its forward end against the outer side of the swinging divider, for the purpose of urging the forward end of the divider inward, and thereby keeping the rod and chain under tension. When the divider is released it swings inward under the action of the spring to the position indicated in Fig. 1. When it is required to move the point of the divider outward, the driver depresses the forward end of the foot-lever K, the effect of which is, through the chain I and rod H, to actuate the lever F, thereby causing the point of the divider to swing outward. The divider stands normally in the inner position, and is automatically locked in such position by means of a vertically-swinging latch, M, secured to the rear edge of the platform or the frame, and arranged to engage with the end of the lever F. Before the lever can be moved to adjust the divider it is necessary to unlock the latch M. This is effected by providing the rod H with a projection, a, beneath the latch, as shown in Fig. 3. The link G permits the rod H to swing downward when released away from the latch M, so that the latter may engage the lever; but when the rod H is drawn endwise by the foot-lever, the link-connection causes its inner end to swing upward, thereby causing the projection a to lift the latch M and unlock the lever and divider, after which the rod, moving endwise, causes the divider to swing outward, as before mentioned. As the foot-lever is relieved from pressure the spring throws the divider inward, the lever F passes beneath the latch, which engages automatically therewith, and the parts assume their original position.

The essential feature of the invention consists in combining with the laterally-movable divider mechanism whereby it may be moved at the will of the driver while the machine is in motion; and it will be manifest to the skilled mechanic that various appliances may be substituted in place of those shown for this purpose.

By means of the divider, adjustable, as described, the driver is enabled to determine at will the width of the swath embraced by the machine, and, in turning at the corners of the field, is enabled to throw the grain at the extreme corners inward to the cutters in such manner as to admit of the machine swinging in a circular path around the corner, thus avoiding the trouble and annoyance incident to the turning of the machine at a right angle, in the usual manner.

We are aware that a laterally-vibrating divider kept in continuous motion by means of a cam-wheel is old, and we lay no claim thereto.

We are aware that a laterally-adjustable divider has been secured by means of a fastening-bolt, the construction being such that it was necessary for the rider to dismount and stop the action of the machine in order to effect the adjustment, which was designed to be a permanent one.

We are aware that a patent has been granted for a means for throwing the grain cut by the inner or heel end of the cutter-bar inward toward the main frame, said means consisting of fingers pivoted vertically to the platform and extending forward beneath and beyond the cutter-bar at intermediate points in its length, and connected with adjusting mechanism under the control of the driver. This we do not claim, our invention being restricted to a divider located at the outer end of the cutter-bar to separate the grain which is to be cut from that which is to be left standing, whereby we are enabled to vary the width of the swath and to give the standing grain a rounding form at the corners of the field.

The present invention is restricted to those matters and things hereinafter claimed, and as to all matters which may be described or shown, but which are not claimed, the right is reserved to make the same the subject of a separate application.

Having thus described our invention, what we claim is—

1. In a grain-harvester, the combination of the platform, the cutting mechanism, and the horizontally-adjustable divider located at the outer end of the cutter-bar, and mechanism, substantially as described, extending thence to a point adjacent to the driver's seat, whereby the driver is enabled to effect the adjustment of the divider while the machine is in motion, and thus vary the width of the swath.

2. In combination with the cutting mechanism and platform, the horizontally-swinging divider, the spring tending to throw said divider inward, a lever adjacent to the driver's seat, and intermediate mechanism, substantially as shown, connecting said lever with the divider, for the purpose of moving the latter outward.

3. In combination with the harvester platform and cutter, the divider located at the outer end of the cutter-bar, and pivoted to swing in a horizontal direction at its forward end, a lever located adjacent to the driver's seat, and intermediate mechanism, substantially as described, connecting said lever and divider, whereby the driver is enabled to effect the adjustment of the divider without dismounting and while the machine is in motion.

4. In a harvester, the combination, with the horizontally-swinging divider, of the lever F, latch M, rod H, link G, and connections, substantially as described.

5. The combination of the swinging divider, the lever attached thereto, the rod H, connecting-link G, and latch M.

ELIAS BARNHARD.
AARON F. THOMAS.

Witnesses:
T. M. CAMPBELL,
J. A. DAVY.